(12) United States Patent
Giordan

(10) Patent No.: US 9,400,232 B2
(45) Date of Patent: Jul. 26, 2016

(54) EPICYCLOIDAL MEASUREMENT SHAFT

(71) Applicant: SNECMA, Paris (FR)

(72) Inventor: Jeremy Giordan, Montrouge (FR)

(73) Assignee: SNECMA, Paris (FR)

(*) Notice: Subject to any disclaimer, the term of this patent is extended or adjusted under 35 U.S.C. 154(b) by 254 days.

(21) Appl. No.: 14/023,885

(22) Filed: Sep. 11, 2013

(65) Prior Publication Data

US 2014/0069177 A1   Mar. 13, 2014

(30) Foreign Application Priority Data

Sep. 12, 2012   (FR) ...................................... 12 58540

(51) Int. Cl.
  *G01M 15/14*   (2006.01)
  *G01M 15/00*   (2006.01)

(52) U.S. Cl.
  CPC .............. *G01M 15/14* (2013.01); *G01M 15/00* (2013.01)

(58) Field of Classification Search
  CPC ............................. G01M 15/14; G01M 15/00
  USPC ................................................. 73/432.1, 431
  See application file for complete search history.

(56) References Cited

U.S. PATENT DOCUMENTS

| | | | | |
|---|---|---|---|---|
| 4,397,619 A | * | 8/1983 | Alliquander | E21B 4/02 175/107 |
| 4,805,404 A | * | 2/1989 | Dupin | B25B 23/1456 60/409 |
| 5,402,855 A | * | 4/1995 | Gondouin | E21B 29/06 175/21 |
| 5,819,612 A | * | 10/1998 | Anderson | B25G 1/085 81/177.4 |
| 6,621,978 B1 | * | 9/2003 | Choi | G02B 6/0005 385/133 |
| 7,111,982 B1 | | 9/2006 | Swonger, Jr. | |
| 2013/0096677 A1 | * | 4/2013 | Myers | A61F 2/0811 623/13.13 |

FOREIGN PATENT DOCUMENTS

DE   FR 2816061 A1 * 5/2002 ................ F01D 5/02

OTHER PUBLICATIONS

Machine translation of Specification of FR 2816061 A1.*
Z Guan, "Finite Element Modelling of Rigidity of Fishing Rods with Various Cross-sections", Apr. 28, 2009, University of Liverpool.*

* cited by examiner

*Primary Examiner* — Helen Kwok
(74) *Attorney, Agent, or Firm* — Pillsbury Winthrop Shaw Pittman LLP

(57) ABSTRACT

A measuring rod capable of receiving a plurality of instrumentation cables transmitting data to a data processing device, includes a section of epicycloidal shape.

6 Claims, 1 Drawing Sheet

EPICYCLOIDAL MEASUREMENT SHAFT

CROSS REFERENCE TO RELATED APPLICATIONS

This application claims the benefit of priority from French Patent Application No. 1258540 filed on Sep. 12, 2012, the entire content of which is incorporated herein by reference.

FIELD

The field of the invention relates to the field of instrumentation systems employed in the architectures of turbomachines for carrying out test campaigns.

More particularly, the invention relates to measuring rods in which are positioned different wiring harnesses making it possible to collect information at the core of the turbomachine and to make it transit to the processing devices of the test bank.

BACKGROUND

Within the scope of turbomachine test campaigns, numerous instrumentation systems are deployed in the architecture of the turbomachine. This instrumentation density involves in particular the placing of multiple routings of different wiring harnesses laid out inside measuring rods which have a circular section.

Given the high rotation regimes encountered during test campaigns, the measuring rods may be subjected to important vibratory excitations that can lead to damaging the instrumentation system or its environment.

SUMMARY

In this context, an aspect of the invention aims to provide a measuring rod making it possible to better withstand dynamic loads during high rotation regimes of the turbomachine while respecting the size constraints imposed by the environment.

To this end, in an embodiment of the invention, there is provided a measuring rod capable of receiving a plurality of instrumentation cables transmitting data to a data processing device, the measuring rod including a section of epicycloidal shape.

The measuring rod according to an embodiment of the invention makes it possible to significantly improve the dynamic behavior of the rod without increasing the mass and without increasing the size compared to a measuring rod of circular profile.

Thus, the measuring rod according to an embodiment of the invention makes it possible to better withstand dynamic loads during tests and makes it possible to be free of risks of damaging the turbomachine.

Beneficially, the section of epicycloidal shape has an outer epicycloidal profile constructed from three arcs of circles of same radius.

Beneficially, the section of epicycloidal shape has an inner epicycloidal profile delimiting an inner space capable of receiving the plurality of instrumentation cables, the inner epicycloidal profile being constructed from three arcs of circles of same radius.

Beneficially, the arcs of circles forming the outer profile and the arcs of circles forming the inner profile are concentric.

An aspect of the invention also relates to an instrumentation system for characterising a turbomachine, the system comprising:
  a data processing device;
  a plurality of instrumentation cables capable of transmitting information collected inside the turbomachine to the data processing device;
  at least one measuring rod according to an embodiment of the invention through which the plurality of instrumentation cables is routed inside the turbomachine.

Embodiments of the invention will be better understood in the light of the description that follows and with reference to the figures, the list of which is given below.

DETAILED DESCRIPTION

Figure 1:
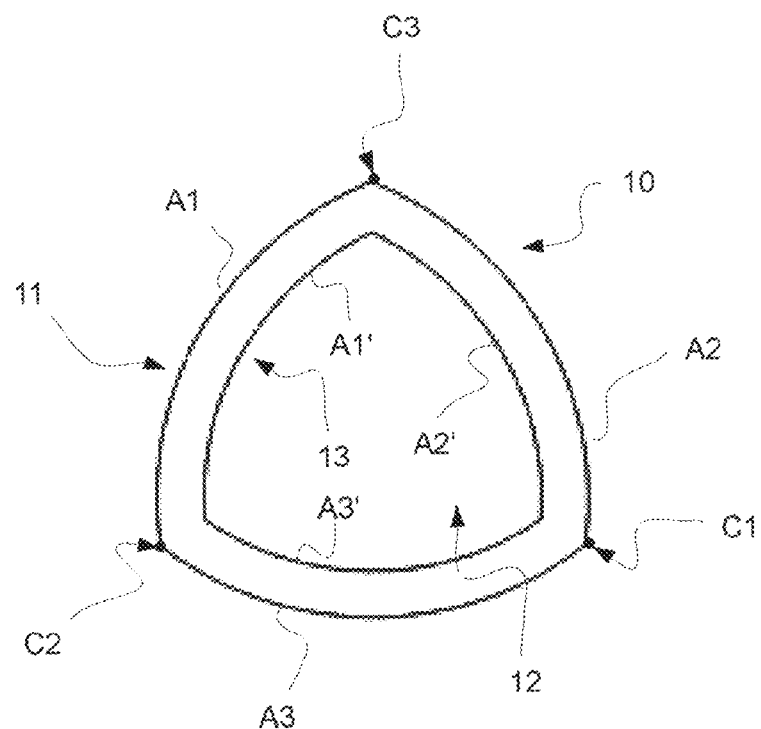
FIG. 1 is a sectional view of the measuring rod according to an embodiment of the invention illustrating the epicycloidal section of the rod.
Figure 2:
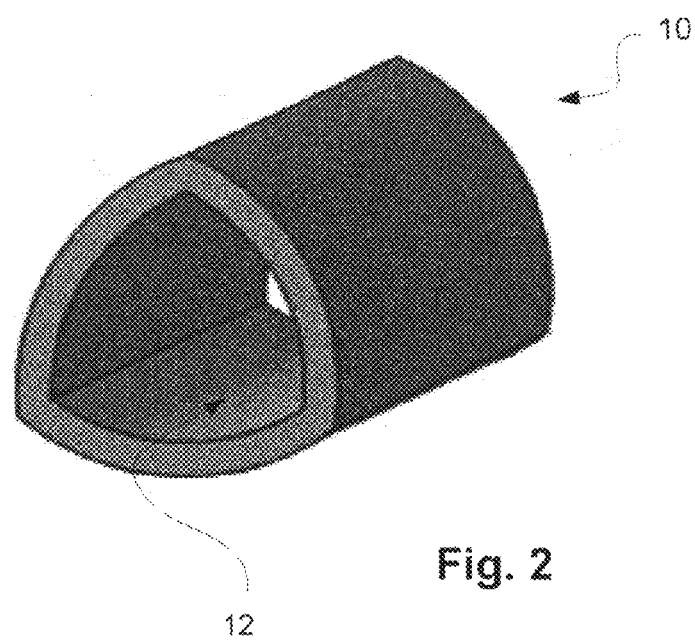
FIG. 2, is a perspective view of a section of the measuring rod according to an embodiment of the invention.

With reference to FIGS. 1 and 2, the measuring rod 10 according to an embodiment of the invention has a section of epicycloidal shape.

The section is illustrated more particularly in FIG. 1. The outer epicycloidal profile 11 of the measuring rod 10 according to an embodiment of the invention is constructed from three isometric arcs (or curved portions epicycloid) referenced A1, A2, A3 each being constructed from circle of the same radius. The inner epicycloidal profile 13 of the measuring rod 10 is constructed from three isometric arcs A1', A2', A3' respectively concentric to the isometric arcs A1, A2, A3 forming the outer profile 11.

The work centers C1, C2, C3 of the isometric arcs A1, A1', A2, A2', A3 and A3' are represented schematically by a point in FIG. 1.

In this manner, the measuring rod 10 has an inner space 12 suited to the passage of instrumentation strands.

The section of epicycloidal shape of the rod according to an embodiment of the invention is particularly beneficial because it makes it possible, at iso-mass, to obtain a gain of the order of 10% in frequency in the dynamic behavior of the measuring rod compared to a rod of the prior art having a circular section.

In addition, such an epicycloidal profile has a dynamic resistance greater than measuring rods having a circular profile with grooves positioned radially to the periphery of the rod.

The profile according to an embodiment of the invention makes it possible to meet the geometric size requirements of turbomachines in which the measuring rods are positioned. Thus, the profile of the rod according to an embodiment of the invention makes it possible to guarantee a satisfactory passage section between the ventilation rod and the measuring rod so as not to perturb the characteristics of the ventilation circuit that passes between the two rods.

In comparison with a measuring rod with circular profile, the measuring rod according to an embodiment of the invention has an outer size reduction of 25% at iso-mass.

The inner space 12 makes it possible to ensure the routing of instrumentation strands. In comparison to measuring rods of circular profile, the internal space 12 of epicycloidal shape has an enlargement of the inner section of the order of 20%.

The measuring rod according to an embodiment of the invention can easily be manufactured by a laser fusion method.

Thus, the solution presented proposes a not very cumbersome system for the passage of cables which enables a greater assembly of instrumentation compared to existing solutions.

The invention claimed is:

1. A measuring rod for receiving a plurality of instrumentation cables transmitting data related to a turbomachine to a data processing device, said measuring rod comprising a section of epicycloidal shape and an inner space extending longitudinally along a length of the measuring rod, the inner space dimensioned to receive the plurality of instrumentation cables.

2. The measuring rod according to claim 1, wherein said section of epicycloidal shape has an outer epicycloidal profile constructed from three isometric arcs, each being constructed from circles of same radius.

3. The measuring rod according to claim 2, wherein said section of epicycloidal shape has an inner epicycloidal profile delimiting the inner space capable of receiving said plurality of instrumentation cables, said inner epicycloidal profile being constructed from three isometric arcs, each being constructed from circles of same radius.

4. The measuring rod according to claim 3, wherein said isometric arcs forming the outer profile and the isometric arcs forming the inner profile are concentric.

5. An instrumentation system for characterizing a turbomachine, said system comprising:
   a data processing device;
   a plurality of instrumentation cables capable of transmitting the information collected inside the turbomachine to the data processing device;
   at least one measuring rod according to claim 1 through which the plurality of instrumentation cables is routed inside the turbomachine.

6. The instrumentation system for characterizing a turbomachine according to claim 5, wherein said section of epicycloidal shape has an outer epicycloidal profile constructed from three isometric arcs, each being constructed from circles of same radius.

* * * * *